(12) United States Patent
Yoon (10) Patent No.: US 6,778,253 B2
(45) Date of Patent: Aug. 17, 2004

(54) APPARATUS AND METHOD FOR DISPLAYING 3-DIMENSIONAL IMAGE

(75) Inventor: Byoungyi Yoon, Ulsan (KR)

(73) Assignee: Geo-Rae Co., Ltd., Ulsan (KR)

( * ) Notice: Subject to any disclaimer, the term of this patent is extended or adjusted under 35 U.S.C. 154(b) by 0 days.

(21) Appl. No.: 10/067,628

(22) Filed: Feb. 4, 2002

(65) Prior Publication Data

US 2002/0113944 A1 Aug. 22, 2002

Related U.S. Application Data

(63) Continuation of application No. PCT/KR01/00944, filed on Jun. 2, 2001.

(30) Foreign Application Priority Data

Jun. 2, 2000 (KR) .............................. 10-2000-0030463

(51) Int. Cl.$^7$ ............................................... G03B 35/00
(52) U.S. Cl. .......................................... 352/57; 352/60
(58) Field of Search ..................................... 352/57, 60

(56) References Cited

U.S. PATENT DOCUMENTS

| | | | | |
|---|---|---|---|---|
| 4,190,856 A | * | 2/1980 | Ricks | 348/335 |
| 4,743,964 A | * | 5/1988 | Allard et al. | 348/42 |
| 5,357,277 A | | 10/1994 | Nakayoshi et al. | 348/55 |
| 5,727,242 A | | 3/1998 | Lo et al. | 396/324 |
| 5,825,539 A | * | 10/1998 | Hoshi | 345/9 |
| 5,912,650 A | * | 6/1999 | Carollo | 345/7 |
| 6,178,043 B1 | | 1/2001 | Son et al. | 359/462 |

FOREIGN PATENT DOCUMENTS

| KR | 1998-073048 | 11/1998 |
|---|---|---|
| KR | 1999-0048195 | 7/1999 |

OTHER PUBLICATIONS

ViewMaster, TruVue, http://www.studio3d.com/pages2/store_VM.htm, Feb. 4, 2002.
View–Master, http://www.fisher–price.com/us/view–master/, Feb. 4, 2002.
View–Master, http://www.fisher–price.com/us/view–master/Default.asp?catid=VMviewer, Feb. 4, 2002.
Welcome to Stereographer.com, http://www/stereographer.com/, Feb. 4, 2002.
Views and Viewers, http://www.stereographer.com/viewers.html, Feb. 4, 2002.
Links and Resources, http://www.stereogragher.com/links, html, Feb. 4, 2002.

* cited by examiner

*Primary Examiner*—Rodney Fuller
(74) *Attorney, Agent, or Firm*—Knobbe, Martens, Olson & Bear LLP.

(57) ABSTRACT

This invention relates to an apparatus for displaying a 3-dimensional image from at least two plane images. The apparatus comprises first and second image display devices, and first and second mirrors. The first and second image display devices receive first and second plane images of an object and invert the left and right sides of the first and second plane images, respectively, and to output the inverted first and second plane images, respectively, each image being produced at first and second positions with respect to the object. The first and second mirror are located between the first and second display devices and configured to receive and reflect the first and second inverted images in a first direction, respectively. The first and second display devices are located on opposite sides of the first and second mirrors.

31 Claims, 5 Drawing Sheets

APPARATUS AND METHOD FOR DISPLAYING 3-DIMENSIONAL IMAGE

RELATED APPLICATIONS

This application is a continuation application of PCT application No. PCT/KR01/00944 filed on Jun. 2, 2001 and published on Dec. 6, 2001 in English, which is hereby incorporated by reference herein.

BACKGROUND

1. Technical Field

The present invention relates to an apparatus for displaying a three dimensional (3-D) image, and more particularly, to an apparatus for displaying a 3-D image by combining two typical mirrors and two plane image display devices.

2. Description of the Related Technology

A 3-D image provides a viewer with a sense of depth and distance between objects in an image, as well as a sense of three dimensions with respect to each of objects or persons in the image. Presently, most images are provided only in two dimensions and various studies have been carried out to overcome such a limit.

Most technologies which enables a 3-D image are based on the fact that a human has two eyes. The principle of perceiving an object in three dimensions by a human lies in that two eyes which are horizontally apart a predetermined distance from each other, for example, about 7.5 cm and 5 cm for adults and children, respectively, see an object through the retina at different angles. An image of the object one sees is transferred to the cerebrum via a visual nerve.

Thus, in a conventional method of providing a 3-D image to a viewer, two images are presented in a shutter or refraction manner so as to be seen independently by the left and right eyes.

Although there was a conventional method of realizing a 3-D image by using LCD eyeglasses, this additional apparatus is not commonly used and has a limited in use. Even when this conventional apparatus is used, if separation of the left and right images is not complete, images overlap each other or an image flickers due to an optical interference phenomenon.

SUMMARY OF CERTAIN INVENTIVE ASPECTS

To solve the above problems, it is desirable to provide an apparatus for displaying a 3-D image by combining two reflection mirrors, two image inverting apparatuses, and two 2-dimensional display apparatuses.

It is another aspect of the present invention to provide an apparatus for displaying a 3-D image which includes a plurality of reflection mirrors, a plurality of image inverting apparatuses, and a plurality of 2-dimensional display apparatuses, and combines different images output from the 2-dimensional display apparatuses to display a 3-D image.

In another aspect, there is provided an apparatus for displaying a 3-dimensional image comprising left and right plane image display devices for simultaneously outputting left and right plane images received with respect to the same object from the left and right sides to a screen, left and right image inverting apparatuses for inverting original left and right images and outputting the inverted images to the left and right plane image display devices, a left reflection mirror, on which an image output from the left plane image display device is incident at a predetermined angle and by which the left image is reflected at the same angle, so that the left image is perceived by a left eye of a viewer, and a right reflection mirror, on which an image output from the right plane image display device is incident at a predetermined angle and by which the right image is reflected at the same angle, so that the right image is perceived by a right eye of a viewer.

In another aspect of the present invention, positions of the left and right plane image display devices and the left and right reflection mirrors are automatically or manually adjusted to maintain the incident angle of an image input to each of the left and right reflection mirrors from the left and right plane image display devices to be the same as the reflection angle of an image reflected by each of the left and right reflection mirrors which is to be seen by each of the left and right eyes of a viewer.

In yet another aspect of the present invention, the left and right plane image display devices are any of image processing apparatuses selected among television monitors, big-screen wall mount TVs, computer monitors, and LCDs.

In yet another aspect of the present invention, in the left and right reflection mirrors, the incident angle of the left and right plane images and the reflection angle of the images reflected to the viewer are adjusted in a range of about 30°–50°.

In yet another aspect of the present invention, the apparatus further comprises inverting apparatuses for inverting the original images and outputting the inverted images to the left and right plane image display devices so that inverted images are output from the left and right plane image display devices.

Another aspect of the invention includes an apparatus for displaying a 3-dimensional image comprising first left and right plane image display devices for simultaneously outputting same plane images from the left and right sides, second left and right plane image display devices for simultaneously outputting same plane images from the left and right sides which are different from the images output from the first left and right plane image display devices, left and right image inverting apparatuses for inverting original left and right images, a first left reflection mirror for synthesizing an image output from the left plane image display device after inverted by the left image inverting apparatus which is incident at a predetermined angle and the original image output from the second left plane image display device which is incident at a predetermined angle, and reflecting the synthesized image, a first right reflection mirror for synthesizing an image output from the right plane image display device after inverted by the right image inverting apparatus which is incident at a predetermined angle and the original image output from the second right plane image display device which is incident at a predetermined angle, and reflecting the synthesized image, a second left reflection mirror, on which the left synthesized image output from the first left reflection mirror is incident at a predetermined angle and by which the left synthesized image is reflected at the same angle, so that the left synthesized image is perceived by a left eye of a viewer, and a second right reflection mirror, on which the right synthesized image output from the first right reflection mirror is incident at a predetermined angle and by which the right synthesized image is reflected at the same angle, so that the right synthesized image is perceived by a right eye of a viewer.

In another aspect of the invention, the apparatus further comprises at least one pair of left and right plane image display devices and at least one pair of left and right inverting apparatuses; the apparatus further comprises at least one pair of reflection mirrors; the first left reflection mirror and the first right reflection mirror are semi-permeable mirrors; the semi-permeable mirror exhibits a transmittance of about 50% and reflectance of about 50%; and in the first and second left and right reflection mirrors, the incident angle of the left and right plane images and the reflection angle of the images reflected to the viewer are adjusted in a range of about 30°–50°.

Another aspect of the invention includes an apparatus for displaying a 3-dimensional image comprising first and second image display devices configured to substantially simultaneously output first and second plane images for a first object, respectively, each image being produced at first and second positions with respect to the first object; first and second inverting devices configured to invert the left and right sides of the first and second plane images, respectively; a first mirror located between the first and second display devices and configured to receive and reflect the first inverted image in a first direction; and a second mirror located between the first and second display devices and configured to receive and reflect the second inverted image in the first direction; wherein the first and second display devices are located on opposite sides of the first and second mirrors.

In yet another aspect of the invention, the first and second mirrors are arranged such that the two mirrors as a whole are substantially "V" shaped; at least one of the first and second mirrors has transmittance of about 50% and reflectance of about 50%; each of the first and second mirrors has reflectance that is greater than 50%; each of the display devices comprise a computer monitor, a TV, a LCD, or any other plane image display device; and the first and second positions are substantially symmetric with respect to a line that passes the first object in a latitudinal direction.

In yet another aspect of the invention, the apparatus further comprises third and fourth image display devices configured to substantially simultaneously output first and second plane images for a second object, respectively, each image being produced at different positions with respect to the second object; a third mirror located between the first display device and the first mirror, the third mirror having first and second sides opposing each other, the first side of the third mirror being configured to receive and transmit the first inverted image to the first mirror, the second side of the third mirror being configured to receive and reflect the third image to the first mirror; and a fourth mirror located between the second display device and the second mirror, the fourth mirror having first and second sides opposing each other, the first side of the fourth mirror being configured to receive and transmit the second inverted plane image to the second mirror, the second side of the fourth mirror being configured to receive and reflect the fourth image to the second mirror; wherein the first and second mirrors are configured to reflect the transmitted and reflected images from the third and fourth mirror in the first direction, respectively.

Another aspect of the invention includes an apparatus for displaying a 3-dimensional image comprising first and second image display devices configured to substantially simultaneously output first and second plane images for a first object, respectively, each image being produced at different positions with respect to the first object; first and second mirrors configured to receive and reflect the first and second images in a first direction and a second direction opposing the first direction; a third mirror configured to receive and reflect the image reflected from the first mirror in a third direction that is substantially perpendicular to the first direction; and a fourth mirror configured to receive and reflect the image reflected from the second mirror in a fourth direction that is the same as the third direction and substantially perpendicular to the second direction; wherein the first and second display devices are located on opposite sides of the first and second mirrors, and wherein the first and second mirrors are located on opposite sides of the third and fourth mirrors.

In another aspect of the invention, the first and second mirrors are arranged such that the two mirrors as a whole are substantially "V" shaped, and at least one of the first, second, third, and fourth mirrors has reflectance that is greater than 50%.

Still another aspect of the invention includes an apparatus for displaying a 3-dimensional image comprising first and second image display devices configured to substantially simultaneously output first and second plane images for a first object, respectively, each image being produced at different positions with respect to the first object; an inverting device configured to invert the left and right side of the first plane image; a mirror configured to receive and reflect the inverted image in a direction; wherein the first and second display devices are located on opposite sides of the mirror, and wherein the second display device is arranged to output the second plane image in the direction.

Still another aspect of the invention includes a method of generating a 3-dimensional image from at least two plane images, comprising: outputting substantially simultaneously first and second plane images for a first object, respectively, each image being produced at first and second positions with respect to the first object; inverting the left and right sides of the first and second plane images, respectively; configuring a first mirror to receive and reflect the first inverted image in a first direction; and configuring a second mirror to receive and reflect the second inverted image in the first direction; wherein the first and second mirrors are arranged such that the two mirrors as a whole are substantially "V" shaped.

In another aspect of the invention, at least one of the first and second mirrors has transmittance of about 50% and reflectance of about 50%; each of the first and second mirrors has reflectance that is greater than 50%; and the first and second positions are substantially symmetric with respect to a line that passes the first object in a latitudinal direction.

In another aspect of the invention, the method further comprises adjusting the first and second mirrors such that incident and reflection angles of the first and second plane images are in a range of about 30°–50°.

In yet another aspect of the invention includes a method of generating a 3-dimensional image from at least two plane images, comprising: outputting substantially simultaneously first and second plane images for a first object, respectively, each image being produced at first and second positions with respect to the first object; configuring a first mirror to receive and reflect the first image in a first direction; and configuring a second mirror to receive and reflect the second image in a second direction opposing the first direction; configuring a third mirror to receive and reflect the image reflected from the first mirror in a third direction that is substantially perpendicular to the first direction; and configuring a fourth mirror to receive and reflect the image reflected from the second mirror in a fourth direction that is the same as the third direction and substantially perpendicular to the second direction.

In another aspect of the invention, the third and fourth mirrors are arranged such that the two mirrors as a whole are substantially "V" shaped; and the first and second mirrors are located on opposite sides of third and fourth mirrors.

DESCRIPTION OF CERTAIN INVENTIVE EMBODIMENTS

Figure 1:
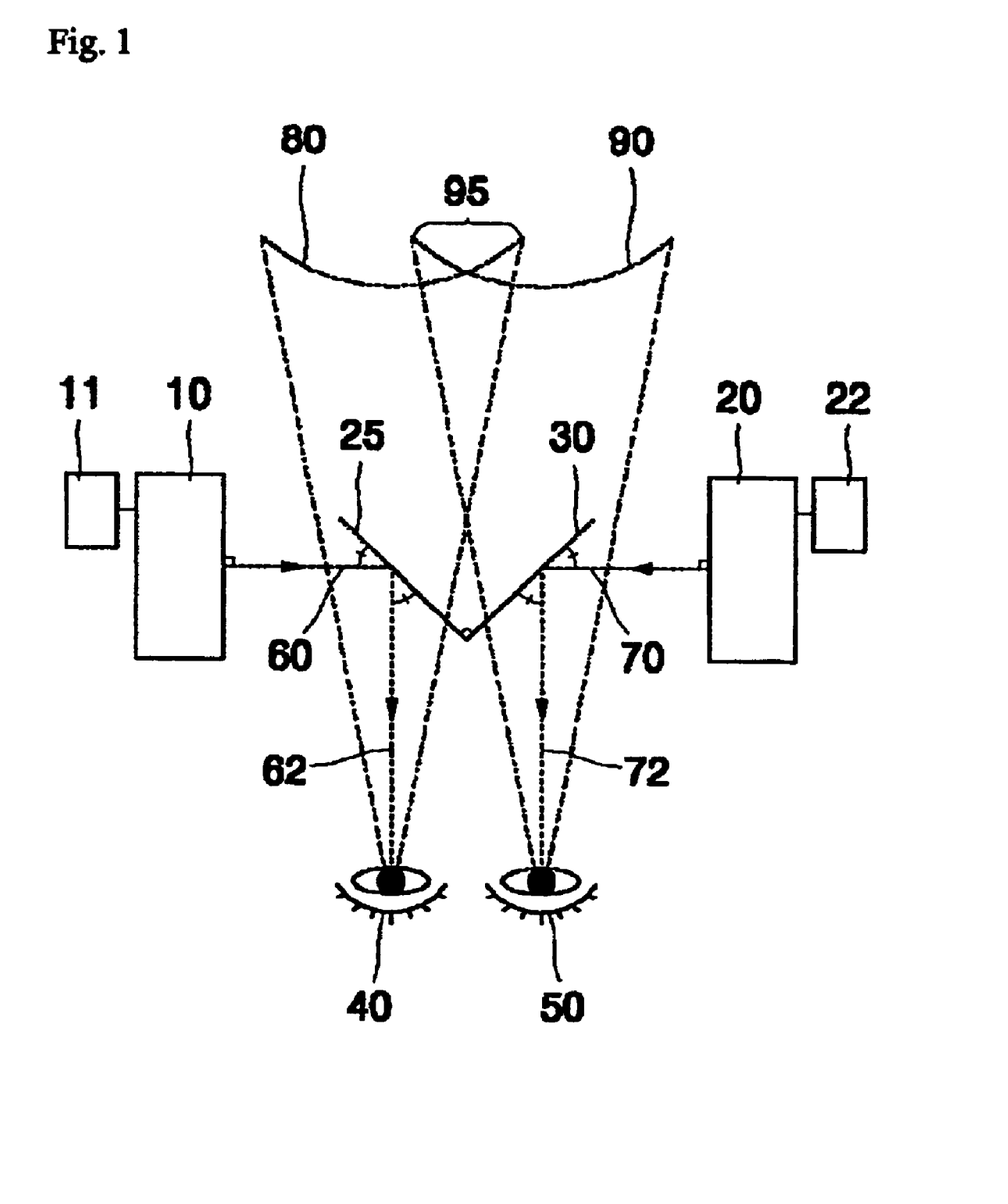
FIG. 1 is a view showing the configuration of one embodiment of an apparatus for displaying a 3-D image according to the present invention, in which each of an incident angle and a reflection angle is about 45°.

Referring to FIG. 1, a left plane display device 10 and a right plane display device 20 may be any of typical television monitors, wall-mount flat TVs, computer monitors, LCD image output devices, and the like. Also, a variety of image output devices for outputting a 2-dimensional plane image only can be selected. Images are inverted by left and right inverting apparatuses 11 and 22 and input to the left and right plane display devices 10 and 20, respectively. The inverted images output from the left and right plane display devices 10 and 20 are incident at an angle of about 45° on a left reflection mirror 25 and a right reflection mirror 30 disposed at the center of the apparatus (60 and 70) and then inverted. The inverted images are transferred to each of the left and right eyes 40 and 50 of a viewer who watches the image as the original image, by being reflected by the left and right reflection mirrors 20 and 30 at an angle of about 45° which is the same as the incident angle. According to a visual transfer process in a human body, images perceived by eyes are transferred to the cerebrum as a left virtual image 80 and a right virtual image 90 by crossing each other. Therefore, by an image synthesizing process, plane images are perceived as a 3-dimensional image (95).

In certain embodiments, the positions of the left and right inverting apparatuses 11 and 22, the left and right plane display apparatuses 10 and 20, and the left and right reflection mirrors 25 and 30 can be adjusted automatically or manually such that the incident angle and reflection angle of images are maintained to be identical. The incident angle and reflection angle are preferably adjusted within a range of about 30–50°. In FIG. 1, the incident angle and reflection angle are adjusted by about 45°. Also, the left and right reflection mirrors 25 and 30 are preferably arranged to be V-shaped with respect to a viewer. Typical 100% reflection mirrors are used as the reflection mirrors.

The present invention does not adopt a conventional digital image synthesizing method, but realizes a 3-D image 95 with improved image quality in a mechanical method, that is, by reflecting plane images input from both sides by using mirrors. Also, the present invention is advantageous in that the size of a screen can be adjusted by adjusting the angle of the mirrors. Also, since the width of a screen can be adjusted freely, a 3-D image can be displayed on a large screen without using an additional apparatus such as a lens or prism, and glasses for view. Further, the distance from the display apparatus and the screen can be adjusted and a focus type 3-D image and a balance type 3-D image can be displayed. Further, a still image and a motion picture can be displayed in 3 dimension.

Figure 2:
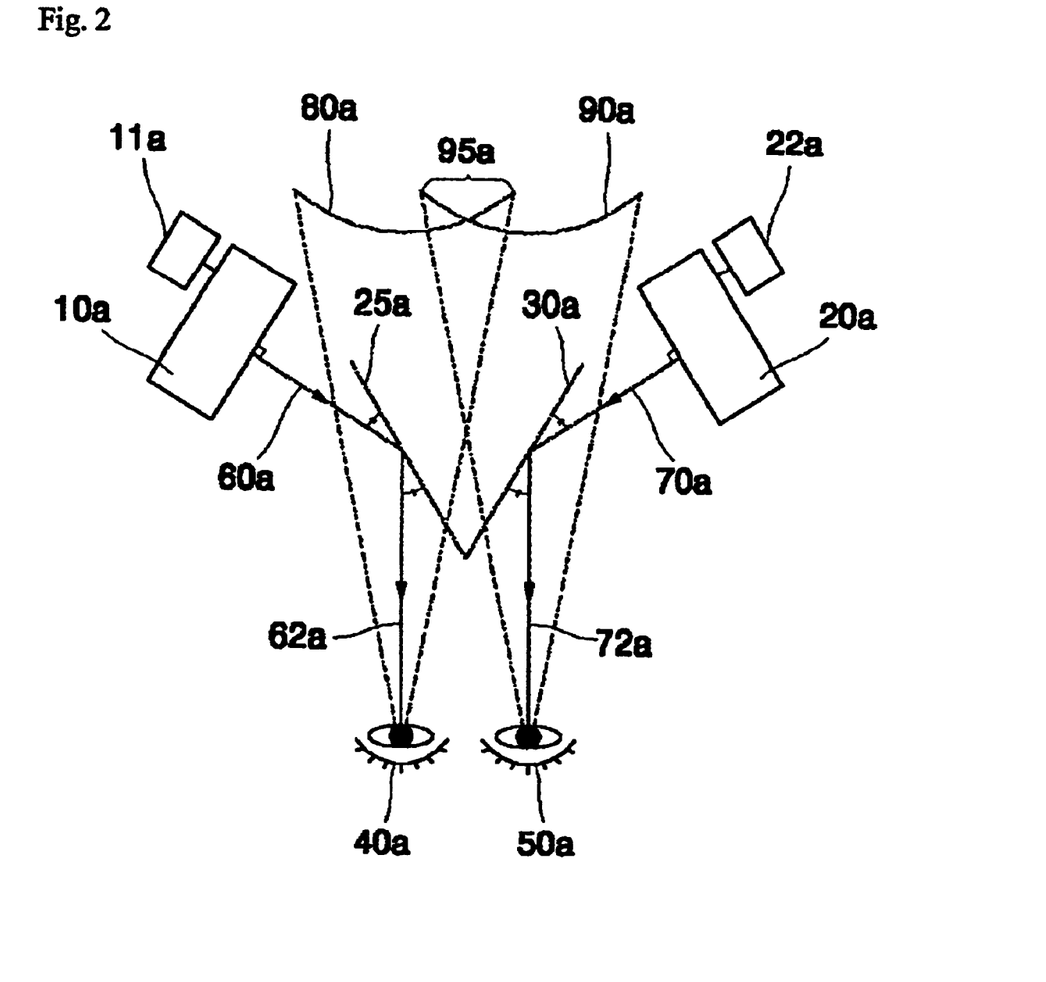
FIG. 2 is a view showing the configuration of an apparatus for displaying a 3-D image according to the present invention, in which each of an incident angle and a reflection angle is about 30°.

FIG. 2 shows the configuration of an apparatus for displaying a 3-D image according to the present invention, in which each of an incident angle and a reflection angle is about 30°. Referring to FIG. 2, a left plane display device 10a and a right plane display device 20a may be any of typical television monitors, wall-mount flat TVs, computer monitors, and LCD image output devices. Also, a variety of image output devices for outputting a 2-dimensional plane image only can be selected. Images are inverted by left and right inverting apparatuses 11a and 12a and output from the left and right plane display devices 10a and 20a. The inverted images output from the left and right plane display devices 10a and 20a are incident on left and right reflection mirrors 25a and 30a disposed at the center at an arbitrary angle of about 30° (60a and 70a) and reflected at the same angle to be transferred to each of left and right eyes 40a and 50a of a viewer who watches the image. According to a visual transfer process in a human body, images perceived by eyes are transferred to the cerebrum as a left virtual image 80a and a right virtual image 90a by crossing each other. Therefore, by an image synthesizing process (95a), plane images are perceived as a 3-dimensinal image.

In certain embodiments, the positions of the left and right plane display apparatuses 10a and 20a and the left and right reflection mirrors 25a and 30a can be adjusted automatically or manually such that the incident angle and reflection angle of images are maintained to be identical. The incident angle and reflection angle are preferably adjusted within a range of about 30–50°. In FIG. 1, the incident angle and reflection angle are adjusted by about 30°. Also, the left and right reflection mirrors 25a and 30a are preferably arranged to be V-shaped with respect to a viewer. Typical reflection mirrors are used as the reflection mirrors.

Figure 3:
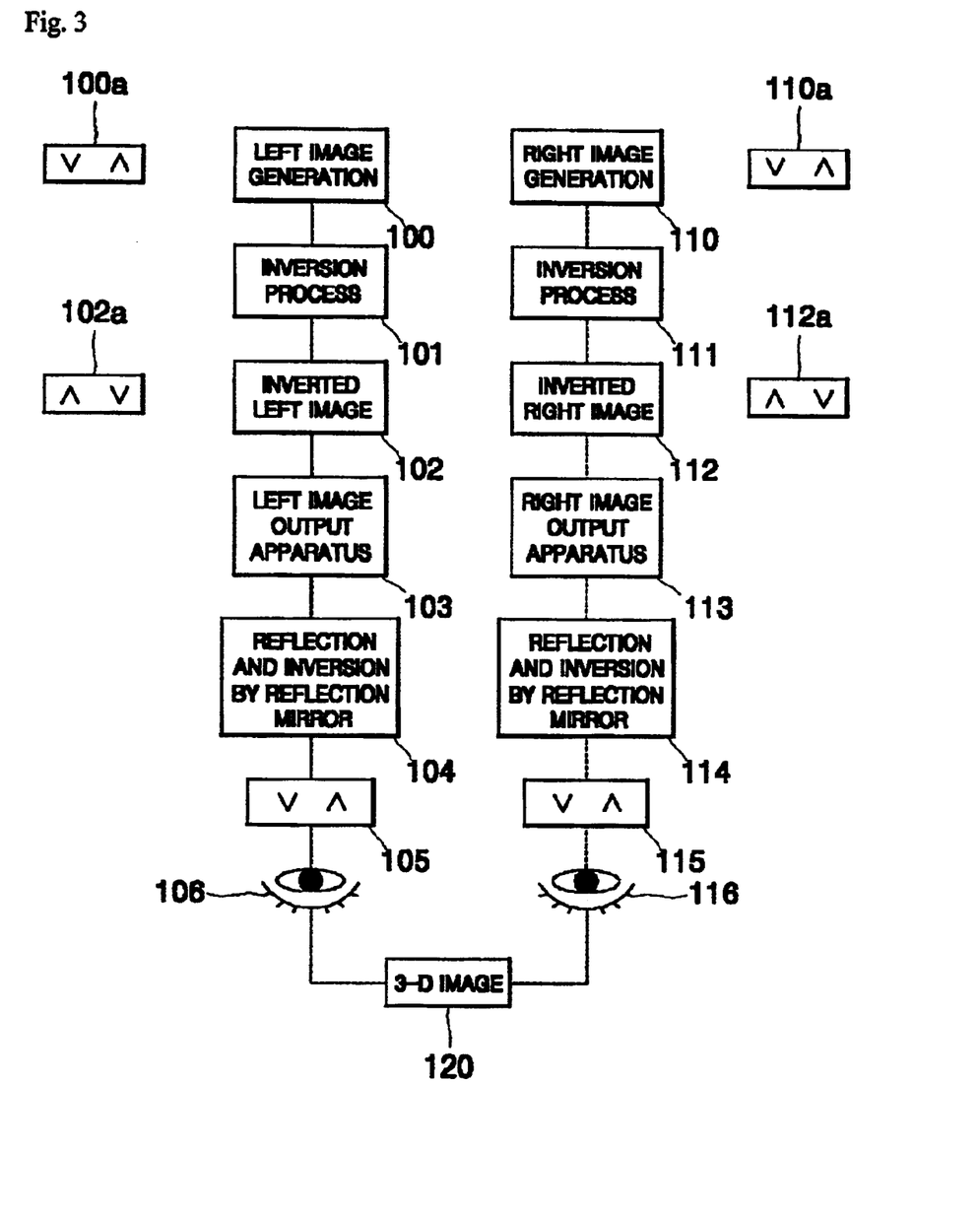
FIG. 3 is a block diagram for explaining steps of inversion and re-inversion of an image according to the present invention.

FIG. 3 is a block diagram for explaining steps of inversion and re-inversion of an image according to the present invention. According to FIG. 3, after a left image 100a is generated (100), the left image 100a is inversion processed (101) to generate an inverted left image 102a. When the inverted left image 102a is output from a left image output apparatus 103 and reflected by a reflection mirror, the inverted left image 102a is re-inverted (104) and restored to the original left image 105. The restored original image is perceived by a left eye 106. Meanwhile, a right image 110a is generated (110) and inversion processed (111) to generate an inverted right image 112a. When the inverted right image 112a is output from a right image output apparatus 113 and reflected by a reflection mirror, the reflected image is re-inverted (114) and restored to the original image 115. The restored original image is perceived to a right eye 116.

The left image and right image individually inverted and re-inverted and finally perceived by the left and right eyes 106 and 116 are synthesized into a virtual image and is perceived as a 3-D image 120, so that the purpose of the present invention is sufficiently achieved.

Also, an image display apparatus to realize synthesis of images according to the present invention will now be described with reference to FIGS. 4 and 5.

Figure 4:
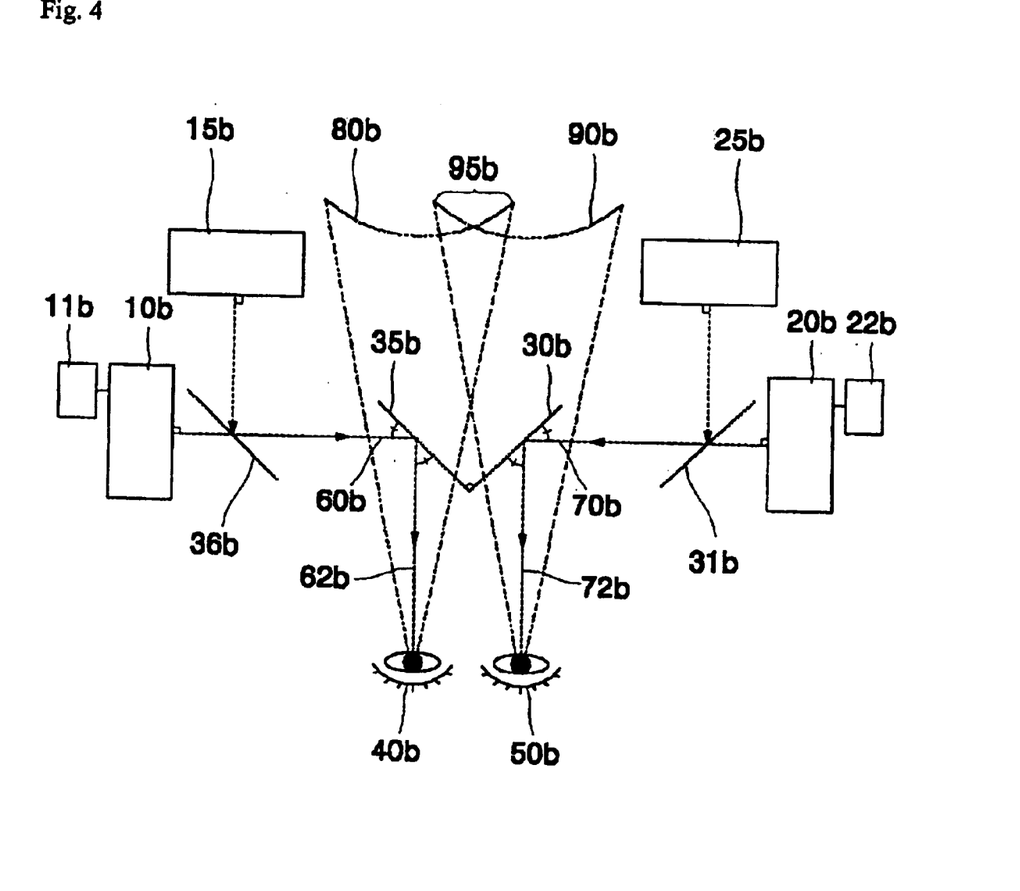
FIG. 4 is a view showing the configuration of an apparatus for displaying a 3-D image according to one embodiment of the present invention to realize synthesis of images.

FIG. 4 is a view showing the configuration of an apparatus for displaying a 3-D image according to a preferred embodiment of the present invention to realize synthesis of images. As shown in FIG. 4, a first left plane image display device 10b, a second left plane image display device 15b, a first right plane image display device 20b, and a second right plane image display device 25b may be any of typical television monitors, wall-mount flat TVs, computer monitors, and LCD image output devices. Also, a variety of image output devices for outputting a 2-dimensional plane image only can be selected.

The first left plane image display device 10b receives an image which is inversion processed by an inverting apparatus 11b, and outputs the received inverted image to be input to a reflection mirror 36b. The second left plane image display device 15b outputs the original image to be input to the reflection mirror 36b. Here, a semi-permeable mirror having a transmittance of about 50% and a reflectance of about 50% is used as the reflection mirror 36b so that images output from the first left plane image display device 10b and the second left plane image display device 15b are synthesized.

The first right plane image display device 20b receives an image which is inversion processed by an inverting apparatus 22b, and outputs the received inverted image to be input to a reflection mirror 31b. The second right plane image display device 25b outputs the original image to be input to the reflection mirror 31b. Here, a semi-permeable mirror having a transmittance of about 50% and a reflectance of about 50% is used as the reflection mirror 31b so that images output from the first right plane image display device 20b and the second right plane image display device 25b are synthesized.

Thus, the images respectively synthesized by the reflection mirrors 36b and 31b are incident on a left reflection mirror 35b and a right reflection mirror 30b at an identical angle of about 45° (60b and 70b), inverted and reflected thereby at the same angle as the incident angle (62b and 72b), and transferred to left and right eyes 40b and 50b of a viewer who watches the image as the original image. According to a visual transfer process in a human body, images perceived by eyes are transferred to the cerebrum as a left virtual image 80b and a right virtual image 90b by crossing each other. Therefore, by an image synthesizing process, plane images are perceived as a 3-dimensinal image (95b).

In certain embodiments, the positions of the first and second left and right inverting apparatuses 10b, 15b, 20b, and 25b, the inverting apparatuses 11b, 16b, 22b, and 26b, and the left and right reflection mirrors 30b, 31b, 35b, and 36b can be adjusted automatically or manually such that the incident angle and reflection angle of images are maintained to be identical. The incident angle and reflection angle are preferably adjusted within a range of about 30–50°. In FIG. 4, the incident angle and reflection angle are adjusted by about 45°. Also, the left and right reflection mirrors 35b and 30b are preferably arranged to be V-shaped with respect to a viewer. Typical 100% reflection mirrors are used as the reflection mirrors. Also, a semi-permeable mirror having a transmittance of about 50% and a reflectance of about 50% can be used as the reflection mirrors 36b and 31b.

Figure 5:
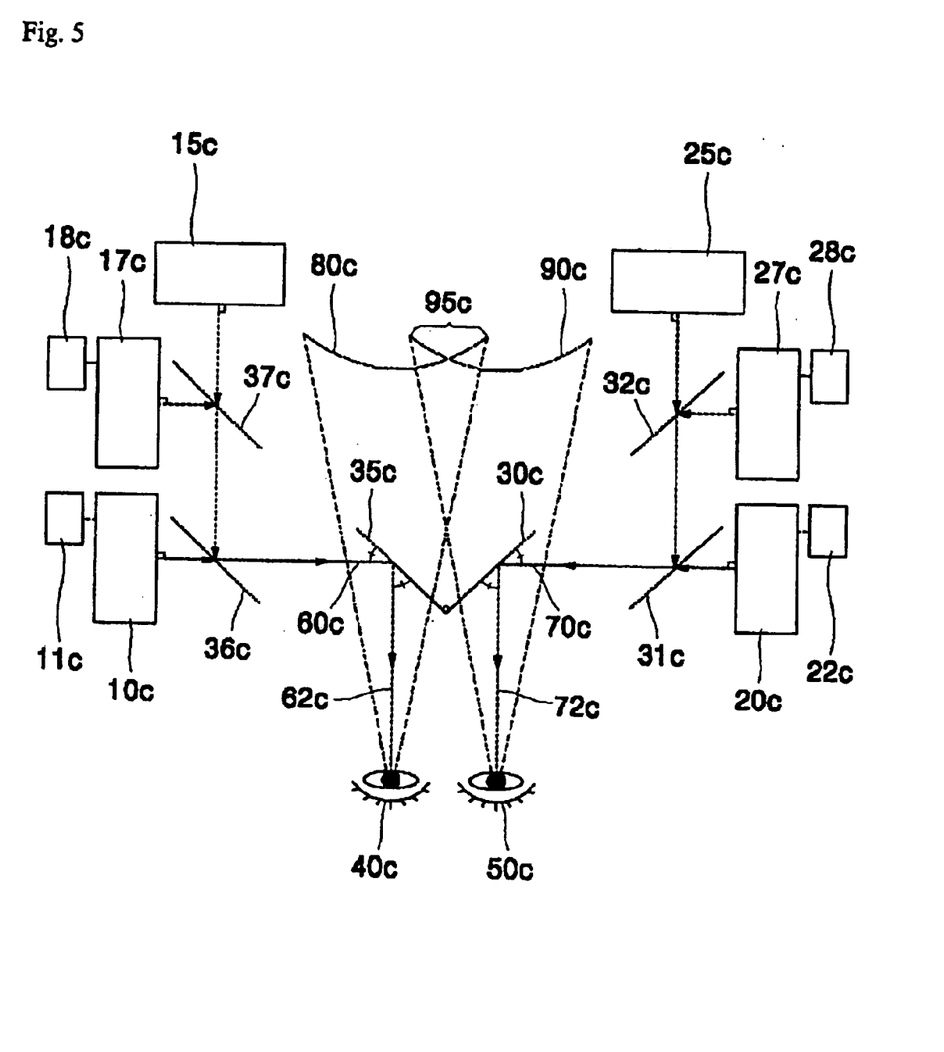
FIG. 5 is a view showing the configuration of an apparatus for displaying a 3-D image according to another embodiment of the present invention to realize synthesis of images.

FIG. 5 is a view showing the configuration of an apparatus for displaying a 3-D image according to another preferred embodiment of the present invention to realize synthesis of images. As shown in FIG. 5, a first left plane image display device 10c, a second left plane image display device 15c, a third left plane image display device 17c, a first right plane image display device 20c, a second right plane image display device 25c, and a third plane right image display device 27c may be any of typical television monitors, wall-mount flat TVs, computer monitors, and LCD image output devices. Also, a variety of image output devices for outputting a 2-dimensional plane image only can be selected.

The second left plane image display device 15c outputs the original image to a reflection mirror 37c. The third left plane image display device 17c outputs an image which is inversion processed by an inverting apparatus 18c to the reflection mirror 37c. Here, a semi-permeable mirror having a transmittance of about 50% and a reflectance of about 50% can be used as the reflection mirror 37c, so that imaged output from the second left plane image display device 15c and the third left plane image display device 17c are synthesized.

The image synthesized by the reflection mirror 37c is incident on a reflection mirror 36c. The first left plane image display device 10c outputs an image which is inversion processed by the inverting apparatus 11c, to the reflection mirror 36c. Here, a semi-permeable mirror having a transmittance of about 50% and a reflectance of about 50% can be used as the reflection mirror 36c, so that imaged synthesized by the reflection mirror 37c and the image output from the first left plane image display device 10c are synthesized.

The second right plane image display device 25c outputs the original image to a reflection mirror 32c. The third right plane image display device 27c outputs an image which is inversion processed by an inverting apparatus 28c to the reflection mirror 32c. Here, a semi-permeable mirror having a transmittance of about 50% and a reflectance of about 50% can be used as the reflection mirror 32c, so that imaged output from the second right plane image display device 25c and the third right plane image display device 27c are synthesized.

The image synthesized by the reflection mirror 32c is incident on a reflection mirror 31c. The first right plane image display device 20c outputs an image which is inversion processed by the inverting apparatus 22c, to the reflection mirror 31c. Here, a semi-permeable mirror having a transmittance of about 50% and a reflectance of about 50% can be used as the reflection mirror 31c, so that imaged synthesized by the reflection mirror 32c and the image output from the first right plane image display device 20c are synthesized.

Thus, the images synthesized by the reflection mirror 36c and the reflection mirror 31c are incident on the left reflection mirror 35c and the right reflection mirror 30c which are disposed at the center, at the same angle of 45° (60c and 70c), respectively, and then inverted. The inverted images are reflected at the same angle as the incident angle (62c and 72c) and transferred to the left and right eyes 40c and 50c of a viewer who watches a screen, as the original images. According to a visual transfer process in a human body, images perceived by eyes are transferred to the cerebrum as a left virtual image 80c and a right virtual image 90c by crossing each other. Therefore, by an image synthesizing process, plane images are perceived as a 3-dimensinal image (95c).

In certain embodiments, the positions of the plane display devices 10c, 15c, 17c, 20c, 25c, and 27c, the inverting apparatuses 11c, 16c, 18c, 22c, 26c, and 28c, and the reflection mirrors 30c, 31c, 32c, 35c, 36c, and 37c can be are adjusted automatically or manually such that the incident angle and reflection angle of images are maintained to be identical. The incident angle and reflection angle are preferably adjusted within a range of about 30–50°. In FIG. 5, the incident angle and reflection angle are adjusted by about 45°. Also, the left and right reflection mirrors 35c and 30c are preferably arranged to be V-shaped with respect to a viewer. Typical 100% reflection mirrors are used as the reflection mirrors. Also, a semi-permeable mirror having a transmittance of about 50% and a reflectance of about 50% can be used as the reflection mirrors 36c, 37c, 31c, and 32c.

While this invention has been particularly shown and described with reference to various embodiments thereof, it will be understood by those skilled in the art that various changes in form and details may be made therein without departing from the spirit and scope of the invention as defined by the appended claims.

Industrial Applicability

As described above, in the apparatus for displaying a 3-D image according to the present invention, unlike the conventional 3-D display apparatus having a complicated structure but no general usability, a 3-D image can be easily realized without additional apparatuses by arranging the two plane image display devices and image inverting apparatuses to the left and right sides and the reflection mirrors in the middle therebetween and adjusting the incident and reflection angles of the reflection mirrors. The apparatus for displaying a 3-D image according to the present invention can be used for a head mounted display, a 3-D game console, a 3-D video broadcasting apparatus, a computer 3-D image communication apparatus, and various simulators.

What is claimed is:

1. An apparatus for generating a 3-dimensional image from at least two plane images, comprising:
   left and right image inverting devices for receiving left and right plane images of an object and inverting the left and right sides of the left and right images, respectively, each plane image being produced at different positions with respect to the object;
   left and right plane display devices for simultaneously outputting the received inverted left and right plane images;
   a left reflection mirror, on which the inverted left image is incident and reflected at the same angle, so that th reflected left image is perceived by a left eye of a viewer; and
   a right reflection mirror, on which the inverted right image is incident and reflected at the same angle, so that the reflected right image is perceived by a right eye of a viewer.

2. The apparatus of claim 1, wherein positions of the left and right plane image display devices and the left and right reflection mirrors are automatically or manually adjusted so as to maintain an incident angle of an image input to each of the left and right reflection mirrors from the left and right plane image display devices to be the same as a reflection angle of an image reflected by each of the left and right reflection mirrors which is to be seen by each of the left and right eyes of a viewer.

3. The apparatus of claim 1, wherein each of the left and right plane image display devices comprises a television monitor, a big-screen wall mount TV, a computer monitor, or a LCD.

4. The apparatus of claim 1, wherein, in the left and right reflection mirrors, incident angles of the left and right plane images and reflection angles of the images reflected to the viewer are adjusted in a range of about 30°–50°.

5. The apparatus of claim 1, wherein the left and right plane image display devices include the left and right image inverting devices therein, respectively.

6. An apparatus for generating a 3-dimensional image from at least two plane images, comprising:
   left and right inverting devices for receiving left and right plane images of a first object and inverting the left and right sides of the left and right images, respectively, each plane image being produced at different positions with respect to the first object;
   first left and right plane image display devices for simultaneously outputting the received inverted left and right plane images;
   second left and right plane image display devices for simultaneously outputting original left and right plane images of a second object, each image being produced at different positions with respect to the second object;
   a first left mirror for synthesizing the inverted left image and the original left image and outputting a left synthesized image;
   a first right mirror for synthesizing the inverted right image and the original right image, and outputting a right synthesized image;
   a second left mirror, on which the left synthesized image is incident and reflected at the same angle, so that the left synthesized image is perceived by a left eye of a viewer; and
   a second right mirror, on which the right synthesized image is incident and reflected at the same angle, so that the right synthesized image is perceived by a right eye of a viewer.

7. The apparatus of claim 6, wherein each of the first left and right mirrors has two sides transmitting and reflecting an input image, respectively.

8. The apparatus of claim 7, wherein each of the first left and right mirrors has transmittance of about 50% and reflectance of about 50%.

9. The apparatus of claim 6, wherein, in the first and second left and right mirrors, incident angles of the left and right plane images and reflection angles of the images reflected to the viewer are adjusted in a range of about 30–50°.

10. The apparatus of claim 6, wherein the first left and right plane image display devices include the left and right image inverting devices therein, respectively.

11. An apparatus for generating a 3-dimensional image from at least two plane images, comprising:
    first and second inverting devices configured to receive first and second plane images of a first object an invert the left and right sides of the first and second plane images, respectively, each image being produced at first and second positions with respect to the first object;
    first and second image display devices configured to substantially simultaneously output the received inverted first and second plane images;
    a first mirror located between the first and second display devices and configured to receive and reflect the first inverted image in a first direction; and
    a second mirror located between the first and second display devices and configured to receive and reflect the second inverted image in the first direction;
    wherein the first an second display devices are located on opposite sides of the first and second mirrors.

12. The apparatus of claim 11, wherein the first and second mirrors are arranged such that the two mirrors as a whole are substantially "V" shaped.

13. The apparatus of claim 12, wherein at least one of the first and second mirrors has transmittance of about 50% and reflectance of about 50%.

14. The apparatus of claim 11, wherein each of the first and second mirrors has reflectance that is greater than 50%.

15. The apparatus of claim 11, wherein each of the display devices comprise a computer monitor, a TV, a LCD, or any other plane image display device.

16. The apparatus of claim 11, wherein the first and second positions are substantially symmetric with respect to a line that passes the first object in a latitudinal direction.

17. The apparatus of claim 11, further comprising:
   third and fourth image display devices configured to substantially simultaneously output third and fourth plane images of a second object, respectively, each image being produced at different positions with respect to the second object;
   a third mirror located between the first display device and the first mirror, the third mirror having first and second sides opposing each other, first side of the third mirror being configured to receive and transmit the first inverted image to the first mirror, the second side of the third mirror being configured to receive and reflect the third image to the first mirror; and
   a fourth mirror located between the second display device and the second mirror, the fourth mirror having first and second sides opposing each other, the first side of the fourth mirror being configured to receive and transmit the second inverted plane image to the second mirror, the second side of the fourth mirror being configured to receive and reflect the fourth image to the second mirror;
   wherein the first and second mirrors are configured to reflect the transmitted and reflected images from the third and fourth mirror in the first direction, respectively.

18. The apparatus of claim 11, wherein the first and second image display devices include the first and second inverting devices therein, respectively.

19. An apparatus for generating a 3-dimensional image from at least two plane images, comprising:
   an inverting device configured to receive a first plane image of an object and invert the left and right side of the first plane image;
   a first image display device configured to output the received inverted first plane image;
   a second image display device configured to output a second plane image of the object, the first and second images being produced at different positions with respect to the object, wherein the first and second image display devices are configured to output substantially simultaneously the inverted first image and the second image, respectively; and
   a mirror configured to receive and reflect the inverted image output from the first image display device in a direction;
   wherein the first d second display devices are located on opposite sides of the mirror,
   and wherein the second display device is arranged to output the second plane image in the direction.

20. The apparatus of claim 19, wherein the first image display devices includes the inverting device therein.

21. A method of generating a 3-dimensional image from at least two plane images, comprising:
   receiving first and second plane images of a first object, each image being produced at first and second positions with respect to the first object, and inverting the left and right sides of the first and second plane images, respectively;
   after the receiving and inverting, displaying substantially simultaneously the inverted first and second plane images;
   configuring a first mirror to receive and reflect the first inverted image in a first direction; and
   configuring a second mirror to receive and reflect the second inverted image in the first direction;
   wherein the first an second mirrors are arranged such that the two mirrors as a whole are substantially "V" shaped.

22. The method of claim 21, wherein at least one of the first and second mirrors has transmittance of about 50% and reflectance of about 50%.

23. The method of claim 21, wherein each of the first and second mirrors has reflectance that is greater than 50%.

24. The method of claim 21, further comprising adjusting the first and second mirrors such that incident an reflection angles of the first and second plane images are in a range of about 30°–50°.

25. The method of claim 21, wherein the first and second positions are substantially symmetric with respect to a line that passes the first object in a latitudinal direction.

26. An apparatus for generating a 3-dimensional image from at least two plane images, comprising:
   first and second image display devices configured to receive first and second plane images of an object an invert the left and right sides of the first and second plane images, respectively, and to substantially simultaneously output the inverted first and second plane images, respectively, each image being produced at first and second positions with respect to the object;
   a first mirror located between the first and second display devices and configured to receive and reflect the first inverted image in a first direction; and
   a second mirror located between the first and second display devices and configured to receive and reflect the second inverted image in the first direction;
   wherein the first and second display devices are located on opposite sides of the first and second mirrors,
   and wherein the first and second display devices directly display the inverted images without use of mirrors.

27. The apparatus of claim 26, wherein the first and second mirrors are arranged such that the two mirrors as a whole are substantially "V" shaped.

28. The apparatus of claim 27, wherein at least one of the first and second mirrors has transmittance of bout 50% and reflectance of about 50%.

29. The apparatus of claim 26, wherein each of the first and second mirrors has reflectance that is greater than 50%.

30. The apparatus of claim 26, wherein each of the display devices comprise a computer monitor, a TV, a LCD, or any other plane image display device.

31. The apparatus of claim 26, wherein the first and second positions are substantially symmetric with respect to a line that passes the first object in a latitudinal direction.

* * * * *

UNITED STATES PATENT AND TRADEMARK OFFICE
CERTIFICATE OF CORRECTION

PATENT NO. : 6,778,253 B2
DATED : August 17, 2004
INVENTOR(S) : Yoon

It is certified that error appears in the above-identified patent and that said Letters Patent is hereby corrected as shown below:

Title page,
Item [74], *Attorney, Agent, or Firm*, after "Bear" insert -- , --.

Column 9,
Line 37, after "plane" insert -- image --.
Line 41, delete "th" and insert -- the --.

Column 10,
Line 3, after "right" insert -- image --.
Line 40, delete "30-50°'" and insert -- 30°-50° --.
Lines 47 and 60, delete "an" and insert -- and --.

Column 11,
Line 17, after "other" insert -- the --.
Line 33, delete "mirror" and insert -- mirrors --.
Line 41, delete "side" and insert -- sides --.
Line 56, after "first" delete "d" and insert -- and --.

Column 12,
Lines 13, 23 and 32, delete "an" and insert -- and --.
Line 52, delete "bout" and insert -- about --.

Signed and Sealed this

Twenty-first Day of March, 2006

JON W. DUDAS
*Director of the United States Patent and Trademark Office*